United States Patent
Wang et al.

(10) Patent No.: US 12,004,105 B2
(45) Date of Patent: Jun. 4, 2024

(54) TIME SYNCHRONIZATION METHOD AND APPARATUS

(71) Applicant: HUAWEI TECHNOLOGIES CO., LTD., Shenzhen (CN)

(72) Inventors: Yi Wang, Shanghai (CN); Zhenyu Shi, Shanghai (CN); Yingjie Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 587 days.

(21) Appl. No.: 17/213,827

(22) Filed: Mar. 26, 2021

(65) Prior Publication Data

US 2021/0219254 A1  Jul. 15, 2021

Related U.S. Application Data (63) Continuation of application No. PCT/CN2019/106111, filed on Sep. 17, 2019.

(30) Foreign Application Priority Data

Sep. 28, 2018 (CN) .......................... 201811137936.3

(51) Int. Cl.
 H04J 3/06 (2006.01)
 H04L 5/00 (2006.01)
 H04W 56/00 (2009.01)
(52) U.S. Cl.
 CPC ....... H04W 56/0015 (2013.01); H04J 3/0682 (2013.01); H04L 5/0048 (2013.01)
(58) Field of Classification Search
 CPC .......................... H04W 56/0015; H04W 56/00; H04L 5/0048; H04L 5/00; H04J 3/0682; H04J 3/06

(Continued)

(56) References Cited

U.S. PATENT DOCUMENTS 6,665,541 B1 * 12/2003 Krasner .................. G01S 11/08
                                                    342/357.42
7,688,747 B2 *  3/2010 Zumsteg ............... H04W 64/00
                                                       370/312

(Continued)

FOREIGN PATENT DOCUMENTS

CN          101123468 A        2/2008
CN          104349450 A        2/2015

(Continued)

OTHER PUBLICATIONS

3GPP TS 38.214 V15.2.0:"3rd Generation Partnership Project;Technical Specification Group Radio Access Network; NR;Physical layer procedures for data (Release 15)",3rd Generation Partnership Project;Technical Specification Group Radio Access Network;NR;Physical layer procedures for data (Release 15),Jun. 2018,total 95 pages.

(Continued)

*Primary Examiner* — Marceau Milord
(74) *Attorney, Agent, or Firm* — HAUPTMAN HAM, LLP (57) ABSTRACT

This application relates to the field of communications technologies, and provides a time synchronization method and an apparatus, to perform positioning and/or timing error measurement on a target terminal in a wireless communications system, so as to avoid a relatively large positioning error caused by a timing error between the target terminal and a base station. The method is used in a wireless positioning system, where the wireless positioning system includes a first node and a second node, and the method includes: The first node receives an arrival time $t_2$ of a first reference signal and a sending time $t_3$ of a second reference signal that are sent by a second node, where the first reference signal is sent by the first node, and the second reference signal is sent by the second node.

20 Claims, 5 Drawing Sheets

(58) Field of Classification Search
USPC .................................... 370/350, 329, 342
See application file for complete search history.

(56) References Cited

U.S. PATENT DOCUMENTS

| | | | | |
|---|---|---|---|---|
| 8,942,172 B2* | 1/2015 | Chen | ..................... | H04W 64/00 370/328 |
| 9,642,167 B1* | 5/2017 | Snyder | ................ | H04L 65/1094 |
| 9,794,753 B1* | 10/2017 | Stitt | .................. | G07C 9/00309 |
| 10,015,769 B1* | 7/2018 | Younis | ....................... | G01S 5/10 |
| 2003/0026182 A1 | 2/2003 | Fischer et al. | | |
| 2008/0056308 A1* | 3/2008 | Zumsteg | ............... | H04J 3/0682 370/503 |
| 2009/0233622 A1* | 9/2009 | Johnson | ................ | G06F 16/245 455/456.3 |
| 2009/0233623 A1* | 9/2009 | Johnson | ................ | H04W 84/18 455/456.3 |
| 2009/0247186 A1* | 10/2009 | Ji | ......................... | G01S 5/0226 455/456.1 |
| 2010/0069035 A1* | 3/2010 | Johnson | ................ | H04W 92/18 455/566 |
| 2012/0309051 A1* | 12/2012 | Ma | ..................... | C07K 14/4702 435/348 |
| 2013/0285855 A1* | 10/2013 | Dupray | ................. | H04W 4/029 342/451 |
| 2015/0018010 A1 | 1/2015 | Fischer et al. | | |
| 2016/0146922 A1* | 5/2016 | Moshfeghi | ............ | H04W 64/00 455/456.6 |
| 2016/0360362 A1* | 12/2016 | Do | ........................ | H04W 4/023 |
| 2017/0041750 A1* | 2/2017 | Jose | ...................... | G01S 5/0244 |
| 2017/0195109 A1 | 7/2017 | Perez-Cruz et al. | | |
| 2017/0212210 A1* | 7/2017 | Chen | ......................... | G01S 5/06 |
| 2017/0289953 A1 | 10/2017 | Chae | | |
| 2018/0310133 A1* | 10/2018 | Ramasamy | ........... | G01S 5/0242 |
| 2020/0107235 A1* | 4/2020 | Peisa | ................... | H04B 7/0617 |

FOREIGN PATENT DOCUMENTS

| | | |
|---|---|---|
| CN | 105682225 A | 6/2016 |
| CN | 105954744 A | 9/2016 |
| CN | 106488550 A | 3/2017 |
| CN | 107003383 A | 8/2017 |
| CN | 107105498 A | 8/2017 |
| CN | 108988972 A | 12/2018 |
| WO | 2011018751 A1 | 2/2011 |
| WO | 2018099568 A1 | 6/2018 |

OTHER PUBLICATIONS

3GPP TS 38.211 V15.3.0 :"3rd Generation Partnership Project;Technical Specification Group Radio Access Network; NR;Physical channels and modulation(Release 15)",Sep. 2018,total 96 pages.

3GPP TS 38.215 V15.3.0:"3rd Generation Partnership Project;Technical Specification Group Radio Access Network; NR;Physical layer measurements(Release 15)",Sep. 2018,total 15 pages.

International Search Report issued in corresponding International Application No. PCT/CN2019/106111, dated Nov. 27, 2019, pp. 1-9, China National Intellectual Property Administration, Beijing, China.

Chinese Office Action issued in corresponding Chinese Application No. 201811137936.3, dated Aug. 11, 2020, pp. 1-13.

Chinese Search Report issued in corresponding Chinese Application No. 201811137936.3, dated Jul. 14, 2020, pp. 1-3.

Huawei, HiSilicon, Discussion on network assist sychronization, R4-167798, 3GPP TSG-RAN WG4 # 80bis Meeting, Ljubljana, Slovenia, Aug. 10-14, 2016, 10 pages.

Extended European Search Report issued in corresponding European Application No. 19865912.0, dated Sep. 24, 2021, pp. 1-11.

* cited by examiner

TIME SYNCHRONIZATION METHOD AND APPARATUS

CROSS-REFERENCE TO RELATED APPLICATIONS

This application is a continuation of International Application No. PCT/CN2019/106111, filed on Sep. 17, 2019, which claims priority to Chinese Patent Application No. 201811137936.3, filed on Sep. 28, 2018, The disclosures of the aforementioned applications are hereby incorporated by reference in their entireties.

TECHNICAL FIELD

The present invention relates to communications technologies, and in particular, to a time synchronization method and an apparatus in a wireless communications system.

BACKGROUND

Positioning is an important function in a mobile communications system, and positioning requires a system to provide location information of a user in real time. A 5th generation mobile communications (5G) system requires high-accuracy positioning. An outdoor positioning error needs to be less than 10 meters, and an indoor positioning error needs to be less than 1 meter.

In a positioning technology in the mobile communications system, a location of a terminal device is estimated based on a distance between the terminal device and one or more base stations. There are two main technologies for distance measurement. One is an air propagation time from a terminal device to a base station, which is referred to as a time of arrival (TOA). The other is a time difference of arrival (TDOA).

A positioning algorithm based on TDOA measurement is a common positioning algorithm. A principle of the positioning algorithm is as follows: When three or more base stations exist in a system, the location of the terminal device can be determined based on a reference signal time difference (RSTD) of positioning reference signals (PRS)/sounding reference signals (SRS) that are transmitted by different base stations in downlink/uplink transmission.

To calculate the location of the terminal device, a TDOA positioning technology requires time synchronization between a plurality of base stations and time synchronization between the base stations and the terminal device. In addition, positioning accuracy depends on synchronization accuracy between the base stations. However, in an actual system, a synchronization error between the base stations is allowed, so as to reduce difficulty of implementing high-accuracy synchronization in the actual system. For example, in a long term evolution (LTE) system, a time synchronization error between the base stations is required to be measured in nanoseconds (ns), and an error range is [−130 ns, 130 ns]. In other words, the error range is from −130 ns to 130 ns. The synchronization error causes an error of distance measurement. A time synchronization error of 130 ns is equivalent to a distance error of 39 meters. Consequently, when the synchronization error exists between the base stations, or when an error exists in the time synchronization between the base stations and the terminal device, a relatively large positioning error is caused, and a 5G positioning requirement cannot be met.

SUMMARY

Embodiments of this application provide a time synchronization method and an apparatus in a wireless communications system, to resolve a problem that a timing error exists between one or more base stations and a target terminal in the wireless communications system.

To achieve the foregoing objective, the following technical solutions are used in the embodiments of this application.

According to a first aspect, a time synchronization method in a wireless communications system is provided, where the wireless communications system includes a first node and a second node, and the method includes: The first node sends a first reference signal to the second node, and receives an arrival time $t_2$ at which the first reference signal arrives at the second node and that is sent by the second node. The first node receives a second reference signal and a sending time $t_3$ at which the second reference signal is sent that are sent by the second node. The first node calculates a time of arrival (TOA) and a timing error $T_{offset}$ based on the arrival time $t_2$ of the first reference signal, the sending time $t_3$ of the second reference signal, a sending time $t_1$ at which the first node sends the first reference signal, and an arrival time $t_4$ of the second reference signal received by the first node. In the foregoing technical solution, the time of arrival (TOA) and the timing error $T_{offset}$ are determined through calculation based on the receiving time and the sending time of the first reference signal and the receiving time and the sending time of the second reference signal, so that a synchronization error between a base station and a target terminal can be effectively eliminated, to improve positioning accuracy.

In a possible implementation of the first aspect, the time of arrival (TOA) is determined according to the following formula:

$$TOA = \frac{(t2-t1)+(t4-t3)}{2},$$

and the timing error $T_{offset}$ is determined according to the following formula:

$$T_{offset} = \frac{(t2-t1)-(t4-t3)}{2}.$$

In a possible implementation of the first aspect, the first node receives the arrival time $t_2$ of the first reference signal and the sending time $t_3$ of the second reference signal through a physical downlink shared channel (PDSCH), a physical uplink shared channel (PUSCH), a media access control control element (MAC CE), a radio resource control (RRC) message, or the long term evolution positioning protocol (LPP)/new radio positioning protocol.

In a possible implementation of the first aspect, the first reference signal includes at least one of the following information: a positioning reference signal (PRS), a channel state information reference signal (CSI-RS), a phase tracking reference signal (PTRS), a demodulation reference signal (DMRS), or a synchronization signal block (SSB). The second reference signal includes at least one of the following reference signals: a sounding reference signal (SRS) or a demodulation reference signal (DMRS).

In a possible implementation of the first aspect, the first reference signal includes at least one of the following information: a sounding reference signal (SRS) or a demodulation reference signal (DMRS). The second reference signal includes at least one of the following reference signals: a positioning reference signal (PRS), a channel state information reference signal (CSI-RS), a phase tracking reference signal (PTRS), a demodulation reference signal (DMRS), or a synchronization signal block (SSB).

In a possible implementation of the first aspect, the first node sends the timing error $T_{offset}$ to the second node, where the timing error $T_{offset}$ is used by the second node for timing compensation. In the foregoing technical solution, the second node can improve synchronization accuracy with the base station through timing compensation, and improve data transmission performance and positioning accuracy.

In a possible implementation of the first aspect, the first node performs timing compensation on the first node based on the timing error $T_{offset}$. In the foregoing technical solution, when the first node is a target terminal, timing is actively compensated by using the timing error obtained through calculation, so as to improve timing accuracy, and improve data transmission performance and positioning accuracy.

In a possible implementation of the first aspect, the first node sends a time type indication to the second node, where the time type indication is used to indicate the second node to report an absolute time or a transition time. In the foregoing technical solution, a time type is specified by using the time type indication, so that the foregoing technical solution can be used to flexibly support applications in different scenarios.

In a possible implementation of the first aspect, the method further includes: The first node further obtains a sum of radio frequency channel processing delays of the first node and the second node. The first node calculates the time of arrival according to the following formula:

$$TOA = \frac{(t2-t1)+(t4-t3)}{2} - (R_{bs} + R_{ue}),$$

and the first node calculates the timing error according to the following formula:

$$T_{offset} = \frac{(t2-t1)-(t4-t3)}{2}.$$

$R_{bs}$ is a radio frequency channel processing delay of the base station, and $R_{ue}$ is a radio frequency channel processing delay of the target terminal. In the foregoing technical solution, the radio frequency channel processing delays of the first node and the second node are considered, so that a positioning error caused by the radio frequency channel processing delays in a sending process of a wireless device is reduced, and positioning accuracy is further improved.

In a possible implementation of the first aspect, the first node receives a radio frequency channel processing delay sent by the second node, where the radio frequency channel processing delay is used by the first node for ranging calculation. In the foregoing technical solution, the radio frequency channel processing delay of the second node is obtained, so that positioning accuracy can be improved.

According to still another aspect of this application, a first node is provided. The first node is configured to implement a function of the time synchronization method according to any one of the possible implementations of the first aspect. The function may be implemented by hardware, or may be implemented by hardware executing corresponding software. The hardware or the software includes one or more units corresponding to the foregoing function.

In a possible implementation, a structure of the first node includes a processor. The processor is configured to support user equipment to perform the time synchronization method according to any one of the first aspect or the possible implementations of the first aspect. Optionally, the first node may further include a memory and a communications interface. The memory stores code and data, the memory is coupled to the processor, and the communications interface is coupled to the processor or the memory.

According to still another aspect of this application, a computer-readable storage medium is provided. The computer-readable storage medium stores an instruction. When the instruction is run on a computer, the computer is enabled to perform the time synchronization method according to any one of the first aspect or the possible implementations of the first aspect.

According to still another aspect of this application, a computer program product including an instruction is provided. When the computer program product runs on a computer, the computer is enabled to perform the time synchronization method according to any one of the first aspect or the possible implementations of the first aspect.

According to still another aspect of this application, a communications system is provided. The communications system includes a plurality of devices, and the plurality of devices include a first node and a second node. The first node is the first node provided in the foregoing aspects, and is configured to support the first node to perform the time synchronization method according to any one of the first aspect or the possible implementations of the first aspect.

According to still another aspect of this application, an apparatus is provided. The apparatus is a processor, an integrated circuit, or a chip, and is configured to perform steps performed by a processing unit of the first node in the embodiments of the present invention. For example, a method for determining a time of arrival and a positioning error has been described in the foregoing other aspects or embodiments, and details are not described herein again.

It may be understood that the apparatus, the computer storage medium, or the computer program product provided above are used to perform corresponding method provided above. Therefore, for beneficial effects of the apparatus, the computer storage medium, or the computer program product, refer to the beneficial effects in the corresponding method provided above, and details are not described herein again.

DESCRIPTION OF EMBODIMENTS

The following describes the technical solutions in embodiments of the present invention with reference to the accompanying drawings in the embodiments of the present invention. It is clear that the described embodiments are merely a part rather than all of the embodiments of the present invention. All other embodiments obtained by a person skilled in the art based on the embodiments of the present invention without creative efforts shall fall within the protection scope of the present invention.

It should be understood that names of all nodes and messages in this application are merely names set for ease of description in this application, and may be different in an actual network. It should not be understood that the names of all the nodes and the messages are limited in this application. On the contrary, any name that has a function the same as or similar to that of the node or the message used in this application is considered as a method or equivalent replacement in this application, and falls within the protection scope of this application. Details are not described below again.

In a 5G system, positioning is a new radio (NR) standard target in release (release) 16. A basic target of 5G positioning is improving positioning accuracy.

Figure 1:
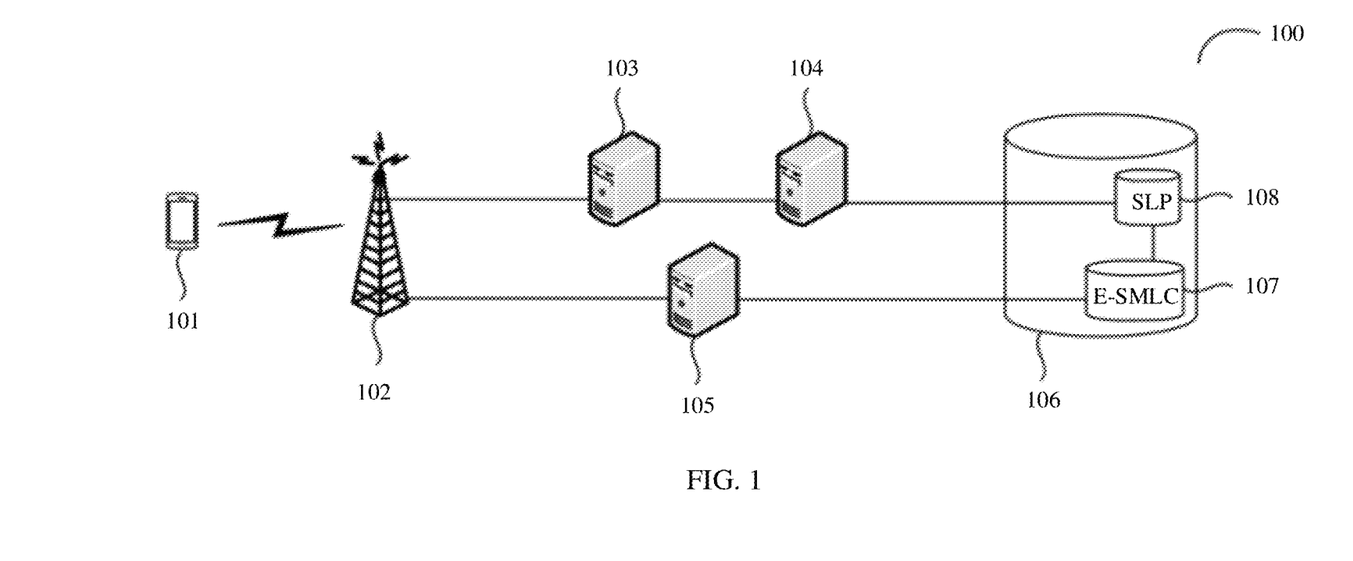
FIG. 1 is a positioning system according to an embodiment of this application.

To facilitate better understanding of a time synchronization method and an apparatus disclosed in the embodiments of the present invention, the following first describes a network architecture used in the embodiments of the present invention. FIG. 1 is a schematic diagram of a structure of a communications system to which an embodiment of this application is applicable.

It should be noted that the communications system mentioned in the embodiments of this application includes but is not limited to a narrowband internet of things (NB-IoT) system, a wireless local area network (WLAN) system, an LTE system, a next-generation 5G mobile communications system, or a communications system after 5G, for example, NR or a device to device (D2D) communications system.

In the communications system shown in FIG. 1, an architecture of a conventional positioning system 100 is provided. The positioning system 100 includes at least a target terminal 101, a base station (BS) 102, and a location server (LS) 106. The location server LS 106 may be a physical entity or a logical entity, manages positioning for the target terminal 101 by obtaining measurement information and other location information from one or more location units, and further provides assistance data for the location unit to determine a location. The LS 106 may include a secure user plane location (SUPL) location platform (SLP) 108 and an enhanced serving mobile location centre (E-SMLC) 107, where the SLP 108 is used for user plane-based location services, and the E-SMLC 107 is used for control plane-based location services. The positioning system 100 may further include a serving gateway (S-GW) 103 and a packet gateway (P-GW) 104 that are used for the user plane-based location services, and a mobility management entity (MME) 105 used for the control plane-based location services.

The target terminal 101 in the positioning system includes but is not limited to: any one of user equipment (UE), a mobile station, an access terminal, a subscriber unit, a subscriber station, a mobile station, a remote station, a remote terminal, a mobile device, a terminal, a wireless communications device, a user agent, a station (ST) in a wireless local area network (WLAN), a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a mobile station in a 5G network, a terminal device in a future evolved public land mobile network (PLMN), and the like. The target terminal may also be referred to as a terminal device, and details are not described below.

The base station 102 includes but is not limited to: an evolved NodeB (eNB), a radio network controller (RNC), a NodeB (NB), a base station controller (BSC), a base transceiver station (BTS), a home evolved NodeB (for example, a home evolved NodeB, or a home node B, HNB), a baseband unit (BBU), an eLTE (eLTE) base station, an NR gNB (gNB), and the like.

In the positioning system 100, control plane-based location services are mainly used for an emergency service. A location message is transmitted between the E-SMLC and the target terminal 101 through a signaling connection. In user plane-based location services, a data link is used to transmit the location message. The SLP 108 processes a SULP message and interfaces with the E-SMLC to obtain the assistance data. The SULP message is routed through the P-GW and the S-GW on the data link. A message between the target terminal 101 and the LS 106 is transmitted by using the LTE positioning protocol (LPP).

An LTE system supports an observed time difference of arrival (OTDOA). In an OTDOA positioning method, a plurality of base stations send positioning reference signals (PRS) to a target terminal, and the target terminal measures, by using the downlink PRSs, a time difference of arrival (TDOA) of PRSs of different base stations that arrive at the target terminal. The target terminal feeds back the measured TDOA to the location centre, and the location centre estimates a location of UE. The measured TDOA is a time difference between a PRS sent by a serving base station and a PRS sent in one or more neighboring base stations, and is referred to as a reference signal time difference (RSTD). In order to calculate a location of the target terminal, a network needs a location of a transmit antenna of the base stations and time synchronization of each base station. If time synchronization between the base stations is not performed, a great challenge to the positioning method is caused. However, usually an error exists in the time synchronization between the base stations, and a time synchronization error exists between the base stations and the target terminal. Consequently, an actually measured TDOA value is inaccurate.

To resolve the foregoing problem, a time synchronization method in a wireless communications system is used in this embodiment. The method includes: A first node sends a first reference signal to a second node, and receives an arrival time $t_2$ at which the first reference signal arrives at the second node and that is sent by the second node. The first node receives a second reference signal and a sending time $t_3$ at which the second reference signal is sent that are sent by the second node. The first node calculates a time of arrival (TOA) and a timing error $T_{offset}$ based on the arrival time $t_2$ of the first reference signal, the sending time $t_3$ of the second reference signal, a time $t_1$ at which the first node sends the first reference signal, and an arrival time $t_4$ of the second reference signal received by the first node. The time of arrival (TOA) includes a difference between a time at which the second node sends a first signal and a time at which the first node receives the first signal sent by the second node, or a difference between a time at which the first node sends a second signal and a time at which the second node receives the second signal sent by the first node. The timing error includes a frame error between the first node and the second node or a slot synchronization error between the first node and the second node. The first signal includes the first reference signal, and the second signal includes the second reference signal.

Specifically, the time of arrival (TOA) is determined according to the following formula:

$$TOA = \frac{(t2-t1)+(t4-t3)}{2},$$

and the timing error $T_{offset}$ is determined according to the following formula:

$$T_{offset} = \frac{(t2-t1)-(t4-t3)}{2}.$$

To further improve positioning accuracy, the first node obtains a sum of radio frequency channel processing delays of the first node and the second node. The first node calculates the time of arrival according to the following formula:

$$TOA = \frac{(t2-t1)+(t4-t3)}{2} - (R_{bs} + R_{ue}),$$

and the timing error is calculated according to the following formula:

$$T_{offset} = \frac{(t2-t1)-(t4-t3)}{2},$$

where $R_{bs}$ is a radio frequency channel processing delay of a base station, $R_{ue}$ is a radio frequency channel processing delay of a target terminal, the first node is the base station, and the second node is the target terminal.

Figure 2:
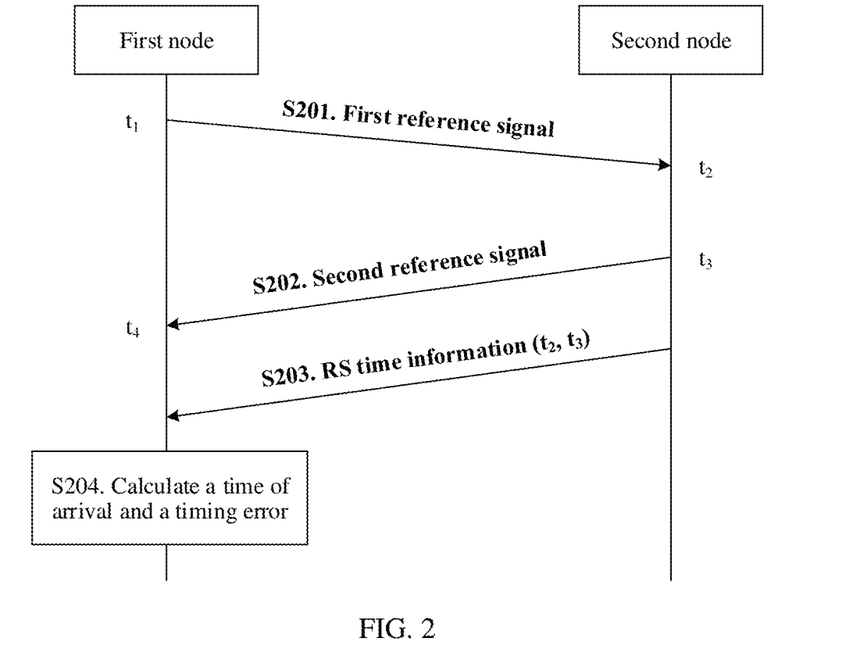
FIG. 2 is a schematic diagram of a time synchronization method according to an embodiment of this application.

FIG. 2 is a schematic flowchart of a time synchronization method according to an embodiment of this application. A first node in FIG. 2 may be a base station or a target terminal. If the first node is the base station, a second node is the target terminal. If the first node is the target terminal, a second node is the base station. Details are not described below.

FIG. 2 includes the following steps.

S201. The first node sends a first reference signal to the second node at a time $t_1$.

When sending the first reference signal, the first node records the time $t_1$ at which the first reference signal is sent. When the first node is the base station, the reference signal sent by the first node is a downlink reference signal. The downlink reference signal includes at least one of a positioning reference signal (PRS), a channel state information reference signal (CSI-RS), a phase tracking reference signal (PTRS), a demodulation reference signal (DMRS), and a synchronization signal block (SSB).

When the first node is the target terminal, an uplink reference signal sent by the first node includes at least one of a sounding reference signal (SRS) and a demodulation reference signal (DMRS).

It should be understood that the downlink reference signal is a reference signal sent by a network to a terminal device, and the uplink reference signal is a reference signal sent by the terminal device to the network.

The second node receives the first reference signal at a time $t_2$, and records the time $t_2$ of the first reference signal.

S202. The second node sends a second reference signal to the first node at a time $t_3$.

After receiving the first reference signal sent by the first node, the second node sends the second reference signal to the first node, and records the sending time $t_3$ of the second reference signal.

When the first node is the base station, the second node is the target terminal. In this case, the second reference signal includes at least one of a sounding reference signal (SRS) and a demodulation reference signal (DMRS).

When the first node is the target terminal, the second node is the base station. In this case, the second reference signal includes at least one of a positioning reference signal (PRS), a channel state information reference signal (CSI-RS), a phase tracking reference signal (PTRS), a demodulation reference signal (DMRS), and a synchronization signal block (SSB).

It should be understood that, in step S201 and step S202, whether the first node is the base station or the target terminal is consistent. To be specific, if the first node in step S201 is the base station, the first node in step S202 is also the base station. If the first node is the base station, the first reference signal is the downlink reference signal, and the second reference signal is an uplink reference signal.

After receiving the second reference signal, the first node records a receiving time $t_4$ of the second reference signal.

S203. The second node sends reference signal (RS) time information to the first node.

The RS time information includes the receiving time $t_2$ of the first reference signal and/or the sending time $t_3$ of the second reference signal. It should be understood that the RS time information herein is merely a name, and this name is not limited in this application, or a sending manner of the receiving time $t_2$ of the first reference signal and/or the sending time $t_3$ of the second reference signal is not limited. Alternatively, the second node may directly encapsulate the receiving time $t_2$ of the first reference signal and/or the sending time $t_3$ of the second reference signal in a message for transmission.

Specifically, if the first node is the base station, the second node is the target terminal. In this case, the second node may send the RS time information to the first node in uplink transmission, where the uplink transmission includes uplink data transmission and uplink signaling transmission. The uplink data transmission is usually performed to the first node through a data channel, for example, a physical uplink shared channel (PUSCH). When the PUSCH is used for transmission, the RS time information may be included in a media access control (MAC) control element (CE). A specific format of the MAC CE is not limited in this application. The transmission may alternatively be performed by using a positioning protocol. The positioning protocol may be the NR positioning protocol (NRPP) or the LTE positioning protocol (LPP). This specifically depends on implementation, and is not limited in this application.

It should be understood that the uplink data transmission is not limited to the PUSCH, an uplink small data transmission channel, for example, a data channel for grant-free (grant-free) transmission, is further included. The grant-free transmission means that the uplink data transmission can be performed without centralized scheduling signaling for resource allocation, and is usually referred to as uplink transmission without grant (uplink transmission without grant). A data channel for the uplink transmission is not limited in this application.

In addition, when the transmission is performed through the uplink data channel, the RS time information may be alternatively encapsulated in a radio resource control (RRC) message, and the RRC message is transmitted as data on the PUSCH.

If the transmission is performed by using uplink signaling, the uplink signaling may include a physical uplink control channel (PUCCH). Because a conventional PUCCH is used for transmission of other uplink signaling, for example, a scheduling request (SR), if the transmission is performed by using the PUCCH, a type indication needs to be used, or another PUCCH is independently configured to transmit the RS time information. A specific PUCCH format or configuration is not limited in this application.

If the first node is the target terminal, and the second node is the base station, the second node sends the RS time information to the first node in downlink transmission. Similarly, downlink transmission includes downlink data transmission and downlink signaling transmission.

For the downlink data transmission, the transmission is usually performed through a physical downlink shared channel (PDSCH). Specifically, the RS time information may be transmitted in a MAC CE, or sent to the target terminal by using an RRC message. The transmission may alternatively be performed by using a positioning protocol. The positioning protocol may be the NR positioning protocol (NRPP) or the LTE positioning protocol (LPP). This specifically depends on implementation, and is not limited in this application.

For the downlink signaling transmission, the transmission may be performed through a physical downlink control channel (PDCCH). Because a quantity of bits of control information transmitted on the PDCCH is relatively small, extension of existing PDCCH control signaling needs to be considered. For example, the first reference signal and the second reference signal are respectively transmitted through two separate PDCCHs. The PDCCH may further include a reference signal receiving indication or a reference signal sending indication. The reference signal receiving indication indicates that time information of the received first reference signal is transmitted on the PDCCH, and the reference signal sending indication indicates that time information of the second reference signal sent by the base station is transmitted on the PDCCH. The RS time information may be expressed as an absolute time or a transition time.

According to an accuracy requirement of 5G positioning, the absolute time is accurate to nanoseconds. It should be understood that the absolute time herein is a time obtained by the second node through measurement, and is, relative to a start location of a current slot or subframe of the base station, a time of arrival that is of a first path or a strongest path of the first reference signal and that is obtained through measurement.

The transition time refers to another expression manner obtained through specific mathematical transformation on the absolute time. The transition time is a time expressed in another manner in which the absolute time is transformed, to reduce a quantity of bits transmitted for the absolute time, so as to reduce transmission overheads.

In this embodiment, the transition time $t_{trans}=t_{abs}$ mod T, where $t_{abs}$ represents the absolute time, and T is a preset time constant. The transition time is a remainder of the absolute time modulo T. Therefore, a value of $t_{trans}$ is an integer ranging from 0 to T, including 0 but excluding T.

In a possible implementation, for the transition time, a physical layer measurement parameter may be represented as N bits, where N is an integer, and a value of T is greater than an error of network time synchronization and a propagation delay from the base station to the target terminal. A maximum time synchronization error of a TDD system is 10 microseconds (μs), a maximum propagation distance in the air is 3 kilometers (km), and a corresponding propagation delay is 10 microseconds, so that T=20 μs. If a bandwidth is 100 MHz, a sampling rate $f_s$ is 153.6 MHz, and a time for each sampling point $T_s=1/f_s=65$ ns. If a minimum time granularity is $T_s$, a value range of the transition time $t_{trans}$ is [−20 μs, 20 μs], which is equivalent to $[−307.7, +307.7]*T_s$. This range can be fully described as $N>\log_2(307.7*2)$ bits. Therefore, N=10 meets transmission of the transition time in this case.

It should be understood that the foregoing method is merely an example of transition time calculation, and a specific implementation method of the transition time is not limited in this application.

The foregoing expression manner of the absolute time is applicable to a case in which a network is completely asynchronous; in other words, absolute times and slot times of different base stations are not aligned, and a message length required for sending the absolute time is long. The expression manner of the transition time is applicable to a case in which synchronization is performed in a network but there is a synchronization error, and a message length required for sending the reference signal time information is relatively short.

S204. The first node calculates a time of arrival and a timing error.

After the first node receives the receiving time $t_2$ of the first reference signal and the sending time $t_3$ of the second reference signal that are sent by the second node, the first node calculates the time of arrival (TOA) and the timing error $T_{offset}$ based on the arrival time $t_2$ of the first reference signal, the sending time $t_3$ of the second reference signal, the time $t_1$ at which the first node sends the first reference signal, and the arrival time $t_4$ of the second reference signal received by the first node. The method is as follows:

The time of arrival is calculated according to the formula:

$$TOA = \frac{(t2-t1)+(t4-t3)}{2}.$$

The timing error is calculated according to the formula:

$$T_{offset} = \frac{(t2-t1)-(t4-t3)}{2}.$$

By using the timing error obtained through calculation according to the foregoing formula, a synchronization error between the base station and the target terminal is eliminated.

After obtaining the time of arrival and the timing error, the first node sends the time of arrival and/or the timing error to a location server (or a location centre) by using the positioning protocol (PP). The positioning protocol may be the NR positioning protocol (NRPP) or the LTE positioning protocol (LPP). This specifically depends on implementation, and is not limited in this application.

If the first node is the base station, the first node may further send the timing error to the second node. The first node sends the timing error obtained through calculation to the target terminal. The target terminal performs timing compensation based on the received timing error $T_{offset}$, where timing compensation is a process of timing adjustment, so as to synchronize with the base station more accurately. Specifically, the first node sends the timing error to the second node by using an RRC message or a MAC CE. A specific message format is not limited in this application. It should be understood that the timing error may be a positive number or a negative number.

If the first node is the target terminal, the first node performs timing compensation based on the timing error $T_{offset}$ obtained through calculation, so as to obtain more accurate timing.

In a possible implementation, if the first node is the base station, the first node sends a time type indication to the second node. As described above, because the receiving time $t_2$ of the first reference signal and the sending time $t_3$ of the second reference signal that are sent by the second node to the first node may be an absolute time, or may be a transition time, the first node may configure in advance whether the second node sends the absolute time or the transition time. Specifically, the first node sends the time type indication to the second node, where the time type indication is used to indicate the second node to report the absolute time or the transition time. Therefore, the RS time information sent by the second node to the first node includes the time type indication to indicate whether the receiving time $t_2$ of the first reference signal and the sending time $t_3$ of the second reference signal that are sent by the second node are the absolute time or the transition time. For example, 1 bit may be used for expression.

In a possible implementation, if the first node is the target terminal, the first node receives a time type indication sent by the second node. A specific time type indication is described above, and details are not described again. After receiving the second reference signal sent by the second node, the terminal may obtain the time of arrival (TOA) and the timing error $T_{offset}$ through calculation. Therefore, the first node sends the time type indication to the location centre by using the positioning protocol.

In a possible implementation, if the first node is the base station, the second node is the target terminal. In this case, the first node may receive first reference signals sent by a plurality of base stations. The first node measures the first reference signals of the base stations, and obtains one (the receiving time $t_2$ of first reference signal and the sending time $t_3$ of second reference signal) pair for each base station. The second node sends, to the first node, the (the receiving time $t_2$ of the first reference signal and the sending time $t_3$ of the second reference signal) pair of each base station obtained through measurement, where the (the receiving time $t_2$ of the first reference signal and the sending time $t_3$ of the second reference signal) pair is a part of RS time information. In this case, the RS time information may further include base station information corresponding to each (the receiving time $t_2$ of the first reference signal and the sending time $t_3$ of the second reference signal) pair. The base station information includes one of a cell identifier (cell identifier, CID), a base station identifier, and a reference signal identifier. Certainly, the time information may further include the foregoing time type indication. Time type indications of the base stations may be the same or may be different. This is not limited in this application.

It should be understood that, in the foregoing solution, the time of arrival and the timing error do not need to be used at a same time. Alternatively, the first node may perform timing compensation on the second node independently by using the foregoing timing error measurement method, or the first node performs timing compensation based on the timing error obtained through calculation, so as to improve timing accuracy between the first node and the second node. Improvement of the timing accuracy may help improve performance during data transmission, and improve frequency efficiency and resource utilization of air interface transmission.

In the foregoing embodiment, the second node sends the receiving time $t_2$ of the first reference signal and the sending time $t_3$ of the second reference signal to the first node, and the first node may obtain the TOA through calculation. In addition, a synchronization error between the first node and the second node can be eliminated, and a particular synchronization error is allowed between different base stations, so that a system design is simplified. In addition, the timing error obtained through calculation may be used to further adjust timing of the first node or the second node, so that synchronization between nodes is more accurate, and positioning accuracy is improved. In addition, compensation may be performed on the timing, so as to improve timing accuracy, and improve data transmission efficiency.

$t_2$, as an example of the time obtained through measurement in the foregoing embodiment, is a time at which the second node receives the first reference signal. However, signal processing is usually performed on a baseband processor. Therefore, the obtained time is obtained after baseband signal processing is completed. However, a signal is usually received from an antenna, and is transmitted to a baseband through a radio frequency channel. This takes some time. Consequently, an actual transmission period over an air interface is shorter than an actual measured time because the measured time includes a transmission period on the radio frequency channel. The time usually ranges from dozens of nanoseconds to hundreds of nanoseconds. This depends on performance implemented by hardware. Therefore, to implement more accurate ranging, the foregoing embodiment may be further optimized.

In this embodiment of this application, a transmission delay of the radio frequency channel is considered, to further improve ranging accuracy. The first node receives a radio frequency channel processing delay sent by the second node, where the radio frequency channel processing delay is used by the first node for ranging calculation.

A specific method is as follows: The second node sends a radio frequency channel processing capability to the first node. The radio frequency channel processing capability includes a radio frequency channel processing time. The radio frequency channel processing capability may be sent to the first node by using capability information, or may be sent to the first node by using the RS time information.

When the first node is the base station, and the second node is the target terminal, the second node may send, through capability reporting, the radio frequency channel processing time to the first node, namely, the base station. If the radio frequency channel processing time is sent to the first node through capability reporting, an RRC message, for example, a UECapabilityInformation message, may be used for transmission. A specific RRC message is not limited in this application.

The second node may alternatively send the radio frequency channel processing time to the first node in the RS time information.

Figure 3:
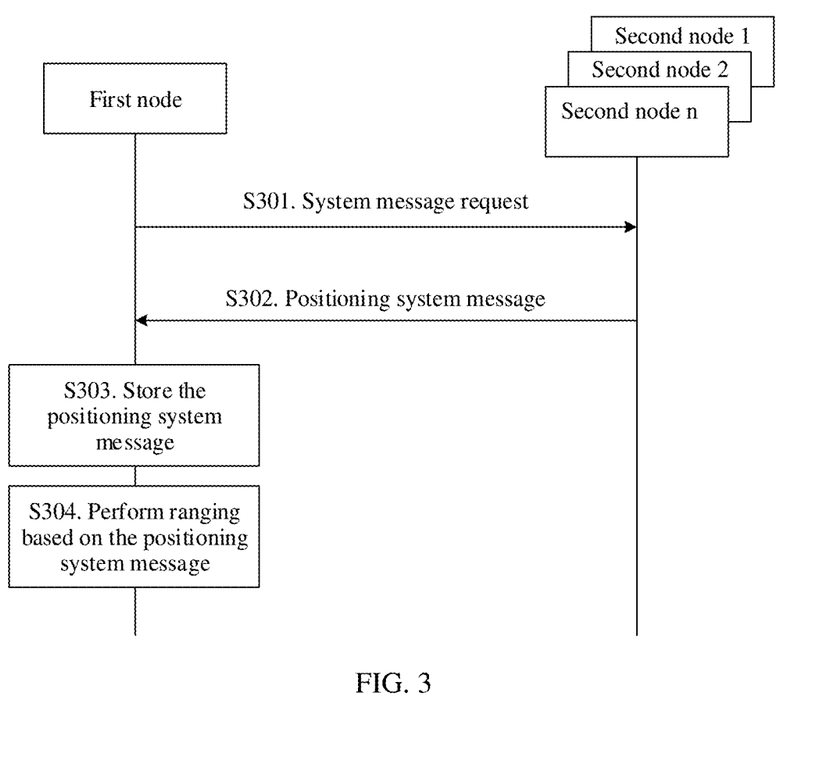
FIG. 3 is a schematic diagram of notification of a radio frequency channel processing delay according to an embodiment of this application.

When the first node is the target terminal, and the second node is the base station, the second node may broadcast the radio frequency channel processing time to the target terminal by using a system message. Specifically, notification may be performed in a positioning system message. A specific name of the positioning system message is not limited in this application. The positioning system message may be an independent system information block (SIB), or may form one SIB with another system message. This is not limited in this application. The following describes a method for obtaining the radio frequency channel processing time by using the system message, as shown in FIG. 3. FIG. 3 includes a plurality of second nodes. Because positioning may need to be performed by using a plurality of base stations, a first node may obtain positioning system messages of the plurality of second nodes.

S301. The first node sends a system message request to the second nodes. The system message request is used by the first node to request the second nodes to send the positioning system message, where the positioning system message includes a radio frequency channel processing time of the second nodes, and the radio frequency channel processing time of the second nodes is denoted as $R_{bs}$.

In a possible implementation, when sending the system message request to the second nodes, the first node may separately send a system message request to each second node. A manner of the system message request is the same as that of a system message request defined in 5G. Details are not described in this application.

In a possible implementation, the first node sends only the system message request to a service node, and the service node is one of the plurality of second nodes. The service node further sends a positioning system cell request indication to a neighboring base station (a neighboring second node). The neighboring base station sends a system message request response to the serving node, where the system message request response may include information about the positioning system message. The service node sends a system message request response message to the first node, where the system message request response message may include the information about the positioning system message of the neighboring base station. The information about the positioning system message includes at least one of duration of the positioning system message, a start frame number of the positioning system message, and a CID of the positioning system message.

In a possible implementation, the first node sends only the system message request to a service node, and the service node is one of the plurality of second nodes. The service node further sends a positioning system cell request indication to a neighboring base station (a neighboring second node). The neighboring base station sends a system message request response to the serving node, where the system message request response may include information about the positioning system message. The service node sends a positioning system message of the serving node and the positioning system message of the neighboring base station to the first node. The positioning system message includes the radio frequency channel processing time of each second node and information about the base station. The information about the base station includes a CID or a base station identifier. The positioning system message may further include duration of the positioning system message and/or a start frame number of the positioning system message.

S302. The second nodes send the positioning system message to the first node.

The positioning system message includes the radio frequency channel processing time of the second nodes. As described above, details are not described again.

S303. The first node stores the positioning system message.

S304. The first node performs ranging based on the positioning system message.

The ranging performed based on the positioning system message may include a plurality of ranging methods, such as TOA and TDOA. This is not limited in this application.

In a possible implementation, the first node obtains a sum of radio frequency channel processing delays of the first node and the second nodes, and a value of a time of arrival (TOA) does not include the sum of radio frequency channel processing delays of the first node and the second nodes.

After the first node receives a receiving time $t_2$ of a first reference signal and a sending time $t_3$ of a second reference signal that are sent by the second nodes, the first node calculates the time of arrival (TOA) and a timing error $T_{offset}$ based on the arrival time $t_2$ of the first reference signal, the sending time $t_3$ of the second reference signal, a time $t_1$ at which the first node sends the first reference signal, an arrival time $t_4$ of the second reference signal received by the first node, the radio frequency channel processing time Rb s included in the positioning system message of the second nodes, and a radio frequency channel processing time $R_{ue}$ of the first node. The calculation method is as follows:

The time of arrival:

$$TOA = \frac{(t2-t1)+(t4-t3)}{2} - (R_{bs}+R_{ue}).$$

The timing error:

$$T_{offset} = \frac{(t2-t1)-(t4-t3)}{2}.$$

$(R_{bs}+R_{ue})$ is the sum of radio frequency channel processing delays of the first node and the second nodes. That the value of the time of arrival (TOA) does not include the sum of radio frequency channel processing delays of the first node and the second nodes means that the time of arrival is calculated according to the foregoing formula $$TOA = \frac{(t2-t1)+(t4-t3)}{2} - (R_{bs}+R_{ue}).$$

In a possible implementation, the first node may not need to obtain the radio frequency channel processing delays of the second nodes by using the positioning system message. Instead, the sum of radio frequency channel processing delays of the first node and the second nodes is estimated by obtaining location information of the second nodes in a global positioning system (GPS). This process may be performed at any time and is not limited to being required only when a location service is started. When the first node is used as a base station, the sum of radio frequency channel processing delays of the first node and the second nodes is determined by obtaining GPS information of a target terminal, the time at which the second nodes receive the first reference signal, and the time at which the second nodes send the second reference signal. A specific method is described below, and details are not described herein again. If the first node is a target terminal, the second nodes determine the sum of radio frequency channel processing delays of the first node and the second nodes in the same method, and sends the sum of radio frequency channel processing delays of the first node and the second nodes to the target terminal, where the sum of radio frequency channel processing delays of the first node and the second nodes may be sent to the target terminal by using dedicated signaling. Specific signaling is not limited in this application. It should be understood that, if the sum of radio frequency channel processing delays of the first node and the second nodes is obtained in this method, the method does not need to depend on a system message.

In a possible implementation, the first node obtains the positioning system message of the plurality of second nodes, where the positioning system message includes the radio frequency channel processing time of the second nodes, and the plurality of second nodes at least include one service node. The first node receives reference signals sent by the plurality of second nodes, where at least there is one in the plurality of second nodes that send the reference signals. The first node calculates a time difference of arrival between one or more second nodes and the service node based on the radio frequency channel processing time of each second node.

In a possible implementation, when moving from one cell to another cell, the first node re-obtains the positioning system message. Alternatively, the first node may periodically update the positioning system message, or may aperiodically update the positioning system message. This depends on specific implementation. For example, when the positioning system message changes, the second nodes actively send information to the first node, to trigger the first node to update the positioning system message.

It should be understood that the foregoing steps S301 to S304 do not have a necessary dependency relationship. For example, step S302 does not depend on step S301. The second nodes may actively send the positioning system message. Step S304 does not depend on step S302 either, and ranging and the like may be performed based on the stored positioning system message.

It should be understood that the method for obtaining the radio frequency channel processing time of the second nodes by using the positioning system message may be implemented without depending on the foregoing embodiment, and positioning accuracy of a plurality of positioning methods may be further improved by broadcasting the radio frequency channel processing time by using the positioning system message.

In the foregoing embodiment, the radio frequency channel processing time may be obtained in a plurality of methods. The following embodiment specifically describes a manner of obtaining the radio frequency channel processing time.

In a possible implementation, a first node or a second node obtains the radio frequency channel processing time through device testing, and stores the radio frequency channel processing time in a device as an attribute of the device. The first node or the second node directly uses the parameter as the radio frequency channel processing time.

In a possible implementation, if a first node is a target terminal, a base station receives location information from the target terminal, for example, global positioning system (GPS) information. The base station calculates a distance between a GPS location of the target terminal and the base station, and may obtain a sum of a radio frequency channel processing time of the base station and a radio frequency channel processing time of the target terminal through calculation.

If a first node is a base station, the base station may determine a more accurate TOA by using a sum of radio frequency channel processing time of the base station and a radio frequency channel processing time of a target terminal that are obtained through calculation. In a calculation method, calculation is performed according to the foregoing formula $$TOA = \frac{(t2 - t1) + (t4 - t3)}{2} - (R_{bs} + R_{ue}),$$

and details are not described again.

Specifically, it is assumed that the first node is the base station, and a second node is the target terminal. The target terminal sends GPS information $(x_1, y_1)$ to the base station. If a GPS coordinate of the base station is $(x_2, y_2)$, the base station may calculate the sum of the radio frequency channel processing time of the base station and the radio frequency channel processing time of the target terminal according to the following formula:

$$R_{bs} + R_{ue} = (t2 - t1) - \sqrt{(x_1 - x_2)^2 + (y_1 - y_2)^2}/C, \text{ or}$$

$$R_{bs} + R_{ue} = \frac{(t2 - t1) + (t4 - t3)}{2} - \sqrt{(x_1 - x_2)^2 + (y_1 - y_2)^2}/C,$$

where

C is a speed of light constant $3 \times 10^8$ meters/second (m/s).

If the first node is the target terminal, the base station may send the sum of the radio frequency channel processing time of the base station and the radio frequency channel processing time of the target terminal that are obtained through calculation to the target terminal, so that the target terminal can calculate a more accurate TOA. A calculation method is described above, and details are not described again. The target terminal sends the calculated TOA to a location server by using LPP or NRPP. A method is described above, and details are not described again.

A relatively simple method for calculating the radio frequency channel processing time is an average value method or a proportional allocation method. In the average value method, it is considered that the radio frequency channel processing time of the base station is equal to the radio frequency channel processing time of the target terminal. Therefore, the radio frequency channel processing time can be easily obtained. In the proportional allocation method, the calculated sum of the radio frequency channel processing time of the base station and the radio frequency channel processing time of the target terminal is allocated to the base station and the target terminal in a specific proportion. This allocation method may be an experience-based method. For example, the radio frequency channel processing time of the base station is 60% of the sum of the radio frequency channel processing time of the base station and the radio frequency channel processing time of the target terminal.

It should be understood that the foregoing is only an example of a method for calculating the radio frequency channel processing time, and implementation of obtaining the radio frequency channel processing time is not limited in this application.

In the foregoing method, the radio frequency channel processing time is obtained, so that positioning accuracy can be effectively improved, and an error caused by the radio frequency channel processing time can be reduced.

The foregoing mainly describes the solutions provided in the embodiments of this application from a perspective of interaction between network elements. It may be understood that, to implement the foregoing functions, each network element, for example, the first node or the second node, includes a corresponding hardware structure and/or software module for performing each function. A person skilled in the art should be easily aware that, in combination with the examples described in the embodiments disclosed in this specification, network elements and algorithm steps may be implemented by using hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules in the first node and the second node may be obtained through division based on the foregoing method examples. For example, the first node and the second node may be divided into functional modules, or two or more functions may be integrated into one processing module. The integrated module may be implemented in a form of hardware, or may be implemented in a form of a software functional module. It should be noted that, in the embodiments of this application, division into the modules is an example and is merely logical function division. During actual implementation, another division manner may be used.

Figure 4:
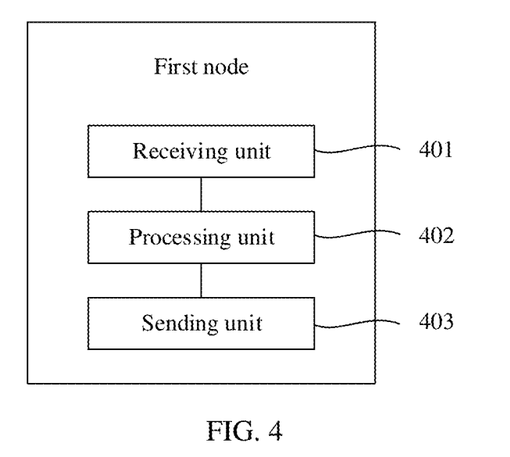
FIG. 4 is a schematic diagram of a possible structure of a first node according to an embodiment of this application.

FIG. 4 is a schematic diagram of a possible structure of the first node in the foregoing embodiments provided in this application. The first node includes a receiving unit 401 and a processing unit 402. The receiving unit 401 is configured to support the first node to perform S202 or S203 in FIGS. 2 and S302 in FIG. 3. The processing unit 402 is configured to support the first node to perform S204 in FIGS. 2 and S303 or S304 in FIG. 3. The first node further includes a sending unit 403, configured to support the first node to perform S201 in FIGS. 2 and S301 in FIG. 3.

In hardware implementation, the receiving unit 401 may be a receiver, and the sending unit 402 may be a transmitter. Alternatively, the receiving unit 401 and the sending unit 402 may be combined into a transceiver, and a receiver and a transmitter are integrated into a communications unit to form a communications interface.

Figure 5:
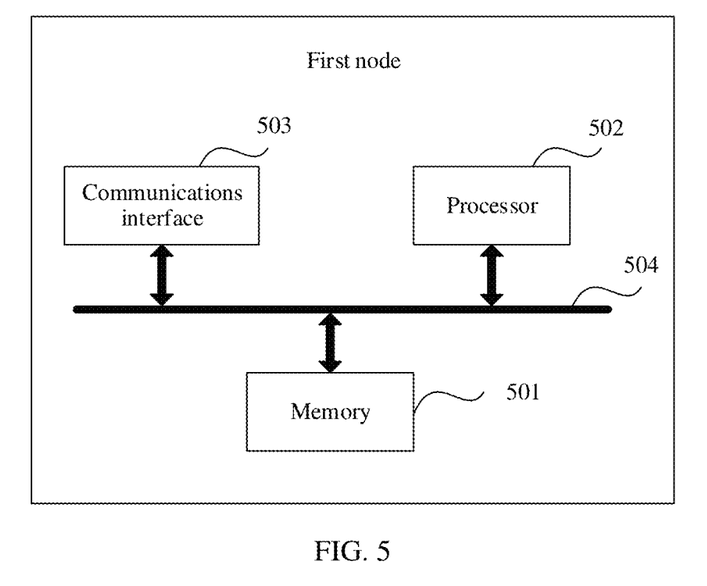
FIG. 5 is a schematic diagram of a possible logical structure of a first node according to an embodiment of this application.

FIG. 5 is a schematic diagram of a possible logical structure of the first node in the foregoing embodiments according to an embodiment of this application. The first node includes a processor 502. In this embodiment of this application, the processor 502 is configured to control and manage an action of the first node. For example, the processor 502 is configured to support the first node to perform S204 in FIGS. 2 and S303 or S304 in FIG. 3 in the foregoing embodiments. The processor 502 is further configured to support the first node to perform processing on a message received or sent by the communications unit in the foregoing embodiments, for example, performing baseband processing on a received reference signal, processing received data that includes an RRC or a MAC CE, and performing protocol processing on a received system message. Optionally, the first node may further include a memory 501 and a communications interface 503. The processor 502, the communications interface 503, and the memory 501 may be connected to each other or connected to each other by using a bus 504. The communications interface 503 is configured to support the first node to perform communication, and the memory 501 is configured to store program code and data of the first node. The processor 502 invokes the code stored in the memory 501 to perform control management. The memory 501 may be coupled to or not coupled to the processor.

The processor 502 may be a central processing unit, a general-purpose processor, a digital signal processor, an application-specific integrated circuit, a field programmable gate array or another programmable logic device, a transistor logic device, a hardware component, or any combination thereof. The processor 502 may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 504 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 5, but this does not mean that there is only one bus or only one type of bus.

Figure 6:
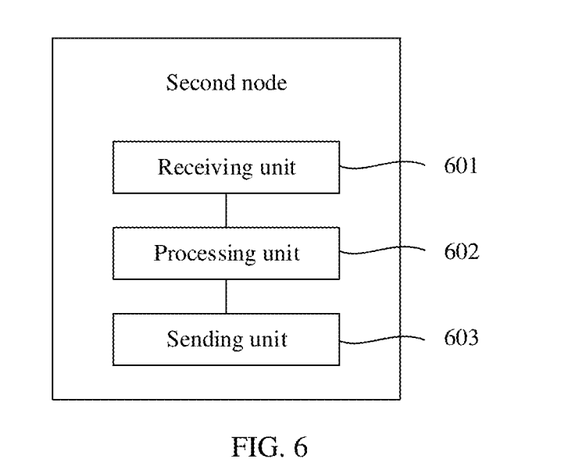
FIG. 6 is a schematic diagram of a possible structure of a second node according to an embodiment of this application.

FIG. 6 is a schematic diagram of a possible structure of the second node in the foregoing embodiments provided in this application. In this application, the second node may be a target terminal or a base station. The second node includes a processing unit 602 and a sending unit 603. The sending unit 603 is configured to support the second node to perform S202 or S203 in FIG. 2 and step S302 in FIG. 3. The processing unit 602 is configured to support the second node to determine the receiving time of the first reference signal and the sending time of the second reference signal in the foregoing embodiments, and is configured to support the second node to generate RS time information and determine sending of a system message. The second node may further include: a receiving unit 601, configured to support the second node to perform S201 in FIG. 2 and step S301 in FIG. 3.

In hardware implementation, the receiving unit 601 may be a receiver, the sending unit 603 may be a transmitter, and the receiver and the transmitter are integrated into a communications unit to form a communications interface.

Figure 7:
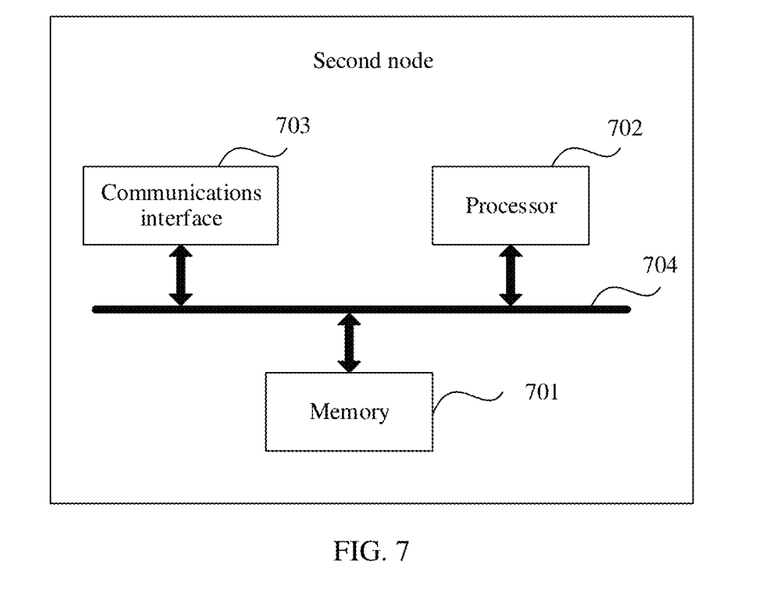
FIG. 7 is a schematic diagram of a possible logical structure of a second node according to an embodiment of this application.

FIG. 7 is a schematic diagram of a possible logical structure of the second node in the foregoing embodiments according to an embodiment of this application. The second node includes a processor 702. In this embodiment of this application, the processor 702 is configured to control and manage an action of the second node. For example, the processor 702 is configured to support the second node to determine the receiving time of the first reference signal and the sending time of the second reference signal in the foregoing embodiments and is configured to support the second node to generate the RS time information and determine sending of a system message. Optionally, the second node may further include a memory 701 and a communications interface 703. The processor 702, the communications interface 703, and the memory 701 may be connected to each other or connected to each other by using a bus 704. The communications interface 703 is configured to support the second node to perform communication, and the memory 701 is configured to store program code and data of the second node. The processor 702 invokes the code stored in the memory 701 to perform control management. The memory 701 may be coupled to or not coupled to the processor.

The processor 702 may be a central processing unit, a general-purpose processor, a digital signal processor, an application-specific integrated circuit, a field programmable gate array or another programmable logic device, a transistor logic device, a hardware component, or any combination thereof. The processor 702 may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 704 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

In another embodiment of this application, a readable storage medium is further provided. The readable storage medium stores a computer-executable instruction. When a device (which may be a single-chip microcomputer, a chip, or the like) or a processor performs the steps of the first node or the second node in the time synchronization method provided in FIG. 2 or FIG. 3, the device or the processor reads the computer-executable instruction in the storage medium. The foregoing readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes a computer-executable instruction, and the computer-executable instruction is stored in a computer-readable storage medium. At least one processor of a device may read the computer-executable instruction from the computer-readable storage medium, and the at least one processor executes the computer-executable instruction, so that the device performs the steps of the first node and the second node in the time synchronization method provided in FIG. 2 or FIG. 3.

In another embodiment of this application, a communications system is further provided. The communications system includes at least a first node and a second node. The first node may be the first node provided in FIG. 4 or FIG. 5, and is configured to perform the steps of the first node in the time synchronization method provided in FIG. 2 or FIG. 3, and/or the second node may be the second node provided in FIG. 6 or FIG. 7, and is configured to perform the steps performed by the second node in the time synchronization method provided in FIG. 2 or FIG. 3. It should be understood that the communications system may include a plurality of second nodes. The first node may simultaneously perform ranging on the plurality of second nodes, and keep time synchronization with a service node in the plurality of second nodes.

In this embodiment of this application, after obtaining a receiving time of a first reference signal and a sending time of a second reference signal from the second node, the first node may determine a time of arrival and a timing error based on the receiving time of the first reference signal, the sending time of the second reference signal, a time at which the first node sends the first reference signal, a time at which the first node receives the second reference signal. This resolves a problem of a positioning error caused when timing between a base station and a target terminal is not strictly synchronized in a wireless positioning system. Further, radio frequency channel processing delays of the first node and the second node are measured, so that positioning accuracy can be further improved.

In conclusion, it should be noted that the foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A time synchronization method in a wireless communications system, wherein the wireless communications system comprises a first node and a second node, and the method comprises:
   sending, by the first node, a first reference signal to the second node, and receiving an arrival time $t_2$ at which the first reference signal arrives at the second node and that is sent by the second node;
   receiving, by the first node, a second reference signal and a sending time $t_3$ at which the second reference signal is sent that are sent by the second node; and
   calculating, by the first node, a time of arrival (TOA) and a timing error $T_{offset}$ based on the arrival time $t_2$ of the first reference signal, the sending time $t_3$ of the second reference signal, a sending time $t_1$ at which the first node sends the first reference signal, and an arrival time $t_4$ of the second reference signal received by the first node, wherein
   the time of arrival (TOA) comprises a difference between a time at which the second node sends a first signal and a time at which the first node receives the first signal sent by the second node, or a difference between a time at which the first node sends a second signal and a time at which the second node receives the second signal sent by the first node, the timing error $T_{offset}$ comprises a frame error between the first node and the second node or a slot synchronization error between the first node and the second node, the first signal comprises the first reference signal, and the second signal comprises the second reference signal.

2. The method according to claim 1, wherein the time of arrival (TOA) is determined according to the following formula:

$$TOA = \frac{(t2 - t1) + (t4 - t3)}{2},$$

and the timing error $T_{offset}$ is determined according to the following formula:

$$T_{offset} = \frac{(t2-t1)-(t4-t3)}{2}.$$

3. The method according to claim 1, comprising: receiving, by the first node, the arrival time $t_2$ of the first reference signal and the sending time $t_3$ of the second reference signal through a physical downlink shared channel (PDSCH), a physical uplink shared channel (PUSCH), a media access control control element (MAC CE), a radio resource control (RRC) message, or the long term evolution positioning protocol (LPP)/new radio positioning protocol (NRPP).

4. The method according to claim 1, wherein the first reference signal comprises at least one of the following: a positioning reference signal (PRS), a channel state information reference signal (CSI-RS), a phase tracking reference signal (PTRS), a demodulation reference signal (DMRS), or a synchronization signal block (SSB); and
   the second reference signal comprises at least one of the following reference signals: a sounding reference signal (SRS) or a demodulation reference signal (DMRS).

5. The method according to claim 4, comprising:
   sending, by the first node, the timing error $T_{offset}$ to the second node, wherein the timing error $T_{offset}$ is used by the second node for timing compensation.

6. The method according to claim 1, wherein the first reference signal comprises at least one of the following: a sounding reference signal (SRS) or a demodulation reference signal (DMRS); and
   the second reference signal comprises at least one of the following reference signals: a positioning reference signal (PRS), a channel state information reference signal (CSI-RS), a phase tracking reference signal (PTRS), a demodulation reference signal (DMRS), or a synchronization signal block (SSB).

7. The method according to claim 6, comprising:
   performing, by the first node, timing compensation on the first node based on the timing error $T_{offset}$.

8. The method according to claim 1, comprising:
   sending, by the first node, a time type indication to the second node, wherein the time type indication is used to indicate the second node to report an absolute time or a transition time.

9. The method according to claim 1, comprising:
   further obtaining, by the first node, a sum of radio frequency channel processing delays of the first node and the second node;
   calculating, by the first node, the time of arrival according to the following formula:

$$TOA = \frac{(t2-t1)+(t4-t3)}{2} - (R_{bs} + R_{ue});$$

and
   calculating, by the first node, the timing error according to the following formula:

$$T_{offset} = \frac{(t2-t1)-(t4-t3)}{2},$$

wherein
   $R_{bs}$ is a radio frequency channel processing delay of a base station, $R_{ue}$ is a radio frequency channel processing delay of a target terminal, the first node is the base station, and the second node is the target terminal.

10. The method according to claim 1, comprising:
    receiving, by the first node, a radio frequency channel processing delay sent by the second node, wherein the radio frequency channel processing delay is used by the first node for ranging calculation.

11. A first node, comprising:
    a receiver, configured to receive an arrival time $t_2$ of a first reference signal and a sending time $t_3$ of a second reference signal that are sent by a second node, wherein the first reference signal is sent by the first node, and the second reference signal is sent by the second node; and
    a processor, configured to calculate a time of arrival (TOA) and a timing error $T_{offset}$ based on the arrival time $t_2$ of the first reference signal, the sending time $t_3$ of the second reference signal, a time $t_1$ at which the first node sends the first reference signal, and an arrival time $t_4$ of the second reference signal received by the first node.

12. The first node according to claim 11, wherein the time of arrival (TOA) is determined according to the following formula:

$$TOA = \frac{(t2-t1)+(t4-t3)}{2},$$

and
    the timing error $T_{offset}$ is determined according to the following formula:

$$T_{offset} = \frac{(t2-t1)-(t4-t3)}{2}.$$

13. The first node according to claim 11, wherein the first node is configured to receive the arrival time $t_2$ of the first reference signal and the sending time $t_3$ of the second reference signal through a physical downlink shared channel (PDSCH), a media access control control element (MAC CE), or a radio resource control (RRC) message.

14. The first node according to claim 11, wherein the first reference signal comprises at least one of the following information: a positioning reference signal (PRS), a channel state information reference signal (CSI-RS), a phase tracking reference signal (PTRS), a demodulation reference signal (DMRS), or a synchronization signal block (SSB); and
    the second reference signal comprises at least one of the following reference signals: a sounding reference signal (SRS) or a demodulation reference signal (DMRS).

15. The first node according to claim 14, further comprising:
    a transmitter, configured to send the timing error $T_{offset}$ to the second node, wherein the timing error $T_{offset}$ is used by the second node for timing compensation.

16. The first node according to claim 14, wherein the processor is further configured to perform timing compensation on the first node based on the timing error $T_{offset}$.

17. The first node according to claim 11, wherein the first reference signal comprises at least one of the following information: a sounding reference signal (SRS) or a demodulation reference signal (DMRS); and
    the second reference signal comprises at least one of the following reference signals: a positioning reference signal (PRS), a channel state information reference signal (CSI-RS), a phase tracking reference signal (PTRS), a demodulation reference signal (DMRS), or a synchronization signal block (SSB).

18. The first node according to claim 11, further comprising:
a transmitter, configured to send a time type indication to the second node, wherein the time type indication is used to indicate the second node to report an absolute time or a transition time.

19. The first node according to claim 11, wherein the receiver is further configured to receive a radio frequency channel processing delay sent by the second node, wherein the radio frequency channel processing delay is used by the first node for ranging calculation.

20. A non-transitory readable storage medium, wherein the non-transitory readable storage medium stores an instruction; and when the non-transitory readable storage medium runs on a device, the device is enabled to perform a time synchronization method, comprising:
sending, by the first node, a first reference signal to the second node, and receiving an arrival time $t_2$ at which the first reference signal arrives at the second node and that is sent by the second node;

receiving, by the first node, a second reference signal and a sending time $t_3$ at which the second reference signal is sent that are sent by the second node; and calculating, by the first node, a time of arrival (TOA) and a timing error $T_{offset}$ based on the arrival time $t_2$ of the first reference signal, the sending time $t_3$ of the second reference signal, a sending time $t_1$ at which the first node sends the first reference signal, and an arrival time $t_4$ of the second reference signal received by the first node, wherein the time of arrival (TOA) comprises a difference between a time at which the second node sends a first signal and a time at which the first node receives the first signal sent by the second node, or a difference between a time at which the first node sends a second signal and a time at which the second node receives the second signal sent by the first node, the timing error $T_{offset}$ comprises a frame error between the first node and the second node or a slot synchronization error between the first node and the second node, the first signal comprises the first reference signal, and the second signal comprises the second reference signal.

* * * * *